No. 853,039. PATENTED MAY 7, 1907.
J. J. STALDER.
CULTIVATOR.
APPLICATION FILED SEPT. 18, 1906.
2 SHEETS—SHEET 2.
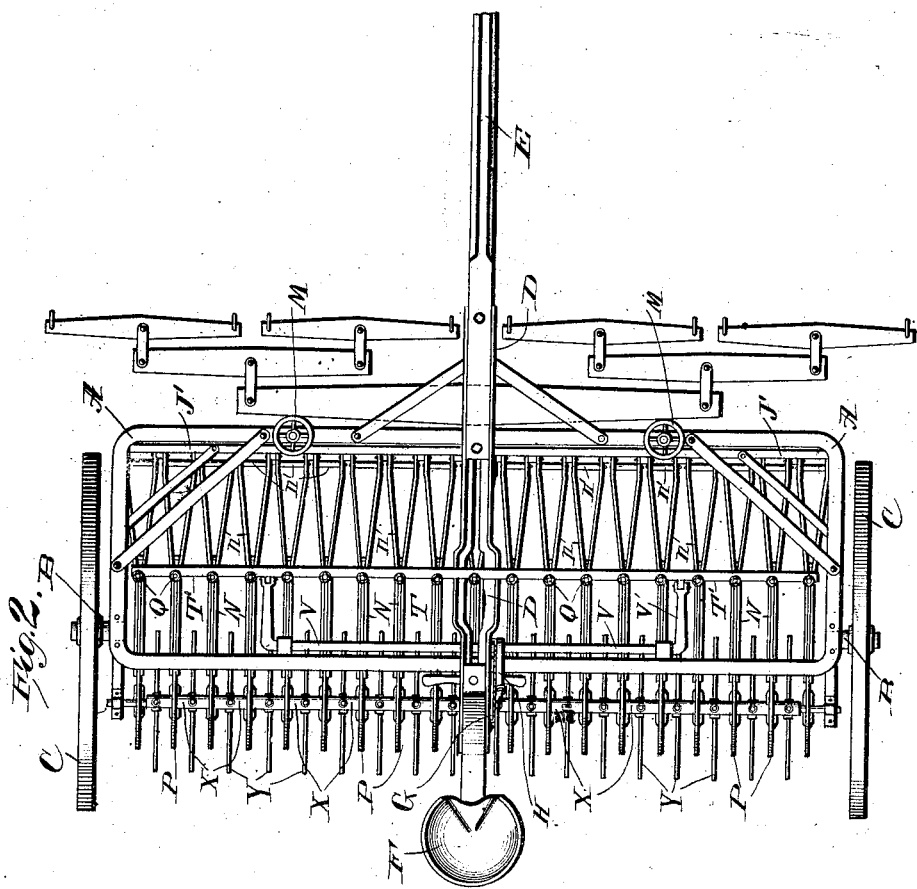
WITNESSES
INVENTOR
JOHN J. STALDER
BY
ATTORNEYS

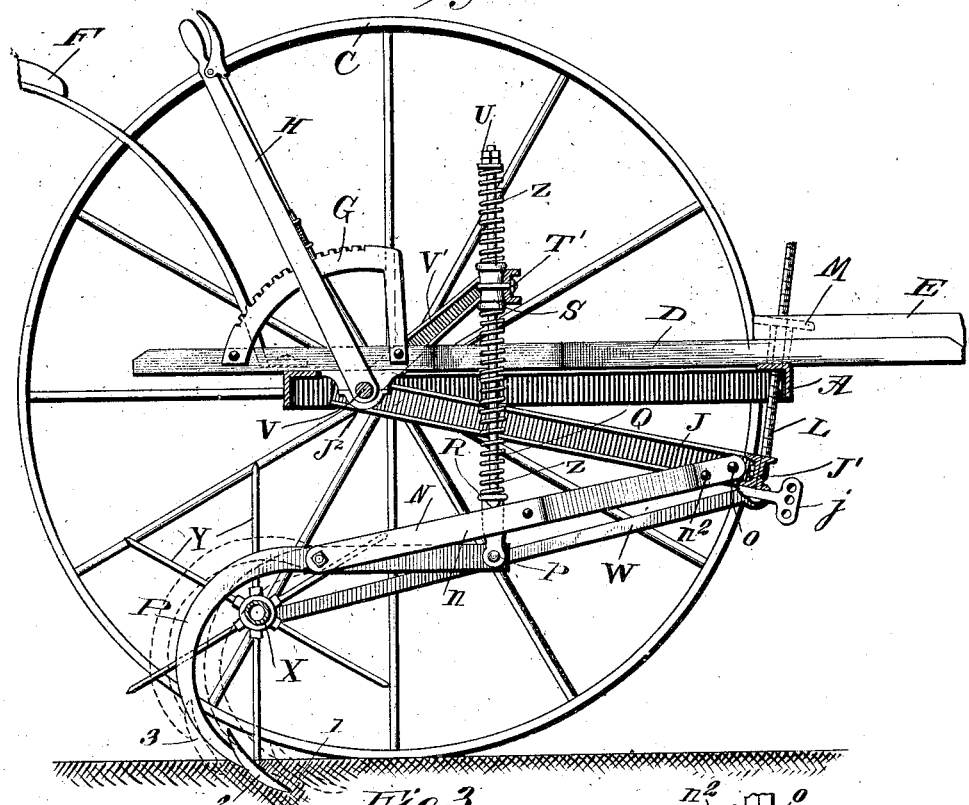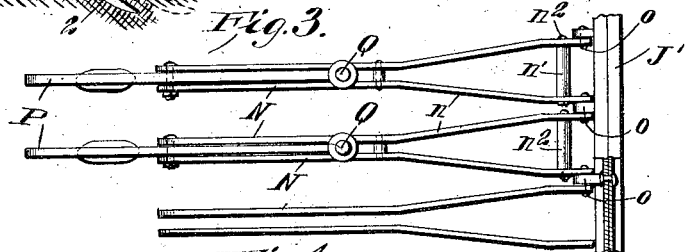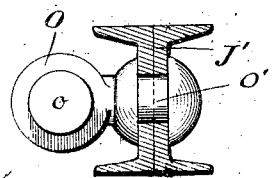

UNITED STATES PATENT OFFICE.

JOHN J. STALDER, OF MEADE, KANSAS.

CULTIVATOR.

No. 853,039.　　　Specification of Letters Patent.　　Patented May 7, 1907.

Application filed September 18, 1906. Serial No. 335,062.

*To all whom it may concern:*

Be it known that I, JOHN J. STALDER, a citizen of the United States, and a resident of Meade, in the county of Meade and State of Kansas, have invented certain new and useful Improvements in Cultivators, of which the following is a specification.

My invention relates to improvements in cultivators and more particularly to that class of cultivators designed to cultivate alfalfa closely, destroying weeds, grasses, etc., without destroying the alfalfa plants.

The object of my invention is to produce a simple cheap and efficient cultivator for the special purposes mentioned, although it may be used for other purposes, and to these ends it consists in certain features of construction, arrangement and combination of parts as will be hereinafter fully described and pointed out in the claims, reference being had to the accompanying drawing in which Figure 1 is a sectional elevation of my improvement. Fig. 2 is a top plan view of same. Fig. 3 is a detail sectional plan view of the subframe. Fig. 4 is a section of the subframe showing pintle of shovel beam.

In the drawing the main frame A which is made of angle iron or steel is mounted on the stub axles B carrying the wheels C; the frame is crossed at its center by the member D which is also of angle iron and supports at its forward end the tongue or shaft E, and near its rear end supports the seat F and also the toothed quadrant G by means of which and a hand ratchet lever H the shovels of the cultivator may be manipulated. From the main frame is suspended the sub-frame J which is pivoted at J² to the main frame at each end, and at the front said sub-frame J is suspended by the screw schafts L which pass through the main frame and have threaded thereon the hand wheels M by means of which said threaded shafts may be raised and lowered and with them the sub-frame J.

To the sub-frame J are attached the composite shovel beams N consisting of the side bars $n$ diverging at their forward ends and pivotally swung to the front crossbar of sub-frame J by the pintles $o$ riveted to the said sub-frame; the side bars $n$ are held apart by a sleeve $n'$ interposed between them and fitted on a bolt $n^2$ passing through said side bars; toward the rear of the side bars $n$ they come close together extending substantially parallel and have pivoted to them the shovel beams P, the forward ends of which are pivotally secured by the clip $p$ to the lower end of rod Q which passes upwardly loosely through a sleeve R held between the side bars $n$; the said rod Q then passes through a thimble S rigidly secured to the channel member T' of a rock frame which will be presently described; surrounding the rod Q above and below the thimble S are coiled springs Z, and at the extreme upper end of said rod Q are the jam or lock nuts U by means of which the tension of said springs may be regulated.

T is a rocker frame consisting of a forward channel member T' before mentioned and the rock shaft V supported by the main frame, and the crank arms V' which engage the aforesaid channel bar T' at their forward ends. The rock shaft is manipulated by the hand lever H.

To the sub-frame J at its center is secured a clevis $j$ by means of which the team may be hitched to the device.

The channel member T' consists of two ⊐ shaped beams placed back to back and held together by the pintles O which consist of the pin portion $o'$ which is passed through said ⊐ shaped beams and then upset, and the pivots $o$ projecting at each side back of the channel member.

To the under side of the main frame at each end is suspended a bar W supporting at its lower end the axle X upon which are mounted a number of walking wheels Y said wheels being so located that there will be one walking wheel between every two shovels; these walking wheels mounted between the shovels are designed to force trash past the shovels.

The angle of the shovels is adjusted by raising or lowering sub-frame J by means of screw L operated by hand wheel M as indicated in Fig. 1 by the positions 1, 2, 3.

The depth of the shovels is adjusted by the lever H mounted on the rock shaft.

As the rods Q pass freely through the thimble which is bolted to the member T' of the channel frame and as the springs Z are mounted on said rod above and below said thimble, it will be seen that the depth of the shovels is controlled through said springs.

I claim—

1. In a cultivator the combination with a wheel supported frame, of a sub-frame pivotally secured at its rear end to the main frame and adjustably suspended at its forward end to said main frame, shovel beams pivotally secured to said sub-frame and shovel standards pivotally secured to said beams.

2. In a cultivator the combination with a wheel supported main frame, of a sub-frame adjustably suspended from the main frame, said sub-frame carrying a series of shovel beams and shovels, and walking wheels between the shovels.

3. In a cultivator the combination with a wheel supported main frame, of a sub-frame pivotally secured at its rear end to the main frame, and adjustably suspended at its forward end to said main frame, shovel beams pivotally secured to said sub-frame, shovel standards pivotally secured to said beams, and cushioning means between the shovel beams and the main frame.

4. In a cultivator the combination with a wheel supported main frame, of a sub-frame pivotally secured at its rear end to the main frame and adjustably suspended at its forward end from said main frame, shovel beams pivotally secured at their forward ends to said sub-frame, shovel standards to which the rear ends of the shovel beams are pivotally secured, a rocker frame secured to the main frame, thimbles secured to said rocker frame, rods passing through said thimbles, and pivotally secured at their lower ends to the forward ends of the shovel standards, and cushioning means interposed between the shovel standards and the rocker frame.

5. In a cultivator the combination with a wheel supported main frame, a sub-frame pivotally secured at its rear end to said main frame, screw threaded shafts secured to the sub-frame at its forward end and passing upwardly through the main frame, hand wheels threaded on said shafts for adjusting the same and shovel beams and shovels carried by the said subframe.

6. In a cultivator the combination with a wheel supported main frame, of a sub-frame pivotally secured at its rear end to the main frame, and adjustably suspended at its forward end from the main frame, shovel beams pivotally secured at their forward ends to the front of the sub-frame, shovel standards pivotally secured to the rear ends of the shovel beams, vertical rods extending upwardly from the forward end of the shovel standards, a rocker frame mounted in the main frame and provided with thimbles through which the aforesaid vertical rods pass, springs mounted on said rods above and below the thimbles, and means for regulating the tension of the springs, and means for operating the rocker frame.

JOHN J. STALDER.

Witnesses:
LEO P. MCMEIL,
LOUIS BOEHLER.